Jan. 29, 1957
P. C. KEITH
2,779,714
HYDROCARBON REFORMING PROCESS
Filed June 30, 1953
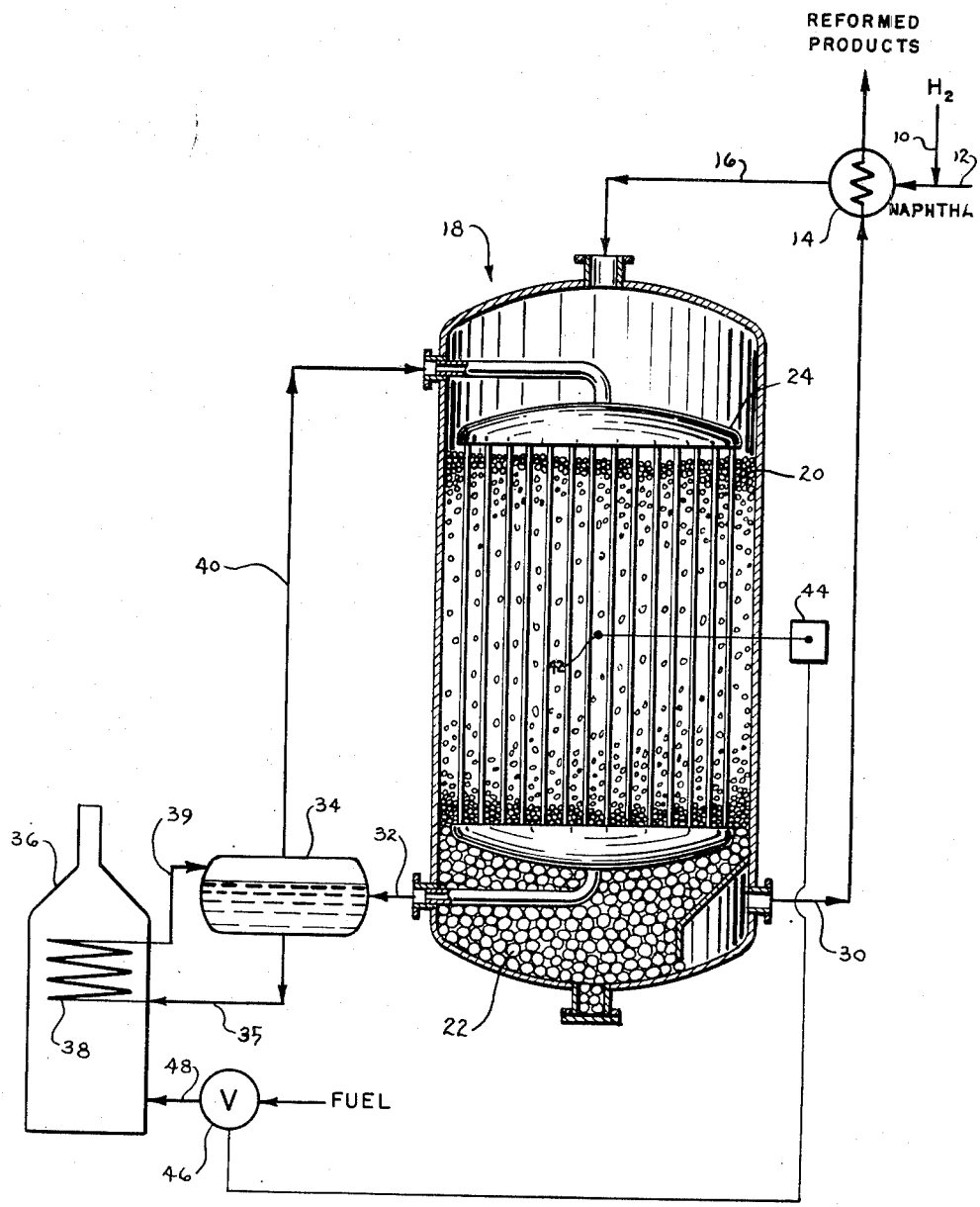
INVENTOR.
PERCIVAL C. KEITH
BY
AGENT

United States Patent Office 2,779,714
Patented Jan. 29, 1957

2,779,714

HYDROCARBON REFORMING PROCESS

Percival C. Keith, Peapack, N. J., assignor to Hydrocarbon Research, Inc., New York, N. Y., a corporation of New Jersey Application June 30, 1953, Serial No. 365,191

4 Claims. (Cl. 196—50)

This invention relates to the treatment of hydrocarbon oils in the naphtha and gasoline boiling point ranges. More particularly, it relates to a process for reforming naphthas in the presence of hydrogen at elevated temperatures and pressures.

Several reforming systems have been proposed for upgrading the octane number of naphthas, e. g., hydroforming, platforming, cat-forming, hourdry-forming, hyperforming and thermophore catalytic reforming. Basically, all involve chemically changing certain constituents in naphthas. Thus, naphthenes are dehydrogenated to form aromatic compounds; straight-chain paraffins are isomerized to branched-chain paraffins; and some paraffins are dehydrocyclized to form ring compounds which may be dehydrogenated to aromatics in the course of the reaction. In all cases, constituents originally present in the naphtha are converted to compounds of increased octane number. Unfortunately, less beneficial reactions also occur under reforming conditions. Thermal cracking occurs to produce normally gasiform materials and carbon. Hydrocracking splits some compounds into lower molecular weight fragments such as butanes, methane, etc. Accordingly, the desirable and undesirable reactions must be balanced off against each other to produce a maximum yield for any specified improvement in octane number. Catalysts are uniformly utilized to accelerate the desired reactions and, wherever possible, to repress the undesired ones.

The thermal characteristics of reforming processes complicate the conversion. The desired reactions of aromatization and dehydrocyclization are endothermic to an extent necessitating the introduction of heat. This heat is customarily introduced with the feed by preheating the hydrogen and naphtha above the desired reaction temperatures, and often by allowing some of the exothermic hydrocracking reaction. Because high temperatures favor thermal cracking, it is not feasible to preheat naphtha to a high temperature level. Prior art commercial installations have utilized multistage conversions, each stage operating adiabatically with reheat furnaces interposed between stages. Even with such expedients and with the highly active platinum catalysts available to the art, considerable thermal cracking cannot be avoided. To escape thermal cracking, which is considered particularly detrimental to platinum catalysts, pressures of at least about 500 p. s. i. g. (pounds per square inch gauge) have been used, only to produce other undesirable effects. Such high pressures tend to favor hydrocracking and repress dehydrocyclization. Consequently, reformers have been operated at some compromise pressure level which involves an appreciable loss of yield due to thermal cracking and hydrocracking in order to achieve the desired improvement in octane number.

A prime object of this invention is to provide a single stage catalytic reforming process, operated substantially isothermally, wherein overheating with its consequent undesirable effect is avoided.

Additional objects and advantages of the invention will be apparent from the description which follows:

Briefly stated, this invention comprises reforming naphtha at specified pressures and temperatures in the presence of hydrogen and a catalyst while supplying heat from a substantially isothermal source directly to the reactants undergoing reformation.

Supplying heat from a substantially isothermal source is a key facet of the invention. It is now possible to prevent thermal cracking by not overheating the feed naphtha. In fact, a reformation operated according to this invention preferably preheats naphtha by indirect heat exchange with the products of reformation. In short, the preheat temperature of the reactants supplied to the reformation zone is generally at least about 50° F. below the temperature of the reaction effluent leaving the reformation zone. More frequently, the preheat temperature is of the order of 100° F. below the temperature of the reaction effluent. By removing the basic necessity for reheat furnaces, addition of heat from the substantially isothermal source permits efficient single stage operation. Over and above elimination of the reheat furnaces there results a further advantage, i. e., more efficient catalyst utilization. When operating adiabatically with heat supplied in the form of naphtha preheat, a substantial temperature swing inside the reformation zone must be permitted. Essentially, this swing ranges from a temperature level somewhat above the desired maximum reformation temperature to one somewhat below the desired minimum reformation temperature. For example, when using active catalysts, the naphtha may enter the reformation zone at 970° F. and be discharged for reheat at 860° F. As a result, the catalyst last contacted by the naphtha is not effectively used because the temperature has dropped below the level for satisfactory reformation. On the other hand, when securing heat from a substantially isothermal source, the naphtha may, for example, enter at 840° F., be heated inside the reformation zone to about 900° F. before the endothermic reactions set in, and from then on never drop below 890° F. Thus, the naphtha is still at satisfactory operating temperatures when it contacts the catalyst near the exit of the reformer. In turn, this feature of preheating to the lower temperature level allows all the preheat to be secured by passing the naphtha in indirect heat exchange relation with the reformation products.

The isothermal source of heat should itself be at temperatures which do not accelerate thermal cracking. For this reason, hot flue gases are not satisfactory for heating the reformation zone. A several hundred degree temperature differential across the heat exchange surfaces in the reformer results in overheating the boundry layer of naphtha. Controlling the flue gas temperature to secure a lower differential, e. g., 75° F., requires an extremely large amount of flue gases to transfer the heat needed and a complex furnace system to secure flue gases at the desired temperature level. A most satisfactory source of isothermal heat is a mercury boiler. By appropriate control of its vapor pressure, mercury can be caused to condense substantially isothermally at any particular temperature in a wide range, e. g., 850 to 1000° F., through heat exchange against the reactants in the reformation zone. The condensed mercury can be revaporized against the much hotter flue gases of a simple furnace. In the light of the good heat exchange properties of mercury under condensing conditions, the temperature differential across the heat exchange surface may be kept low, e. g., not more than 75° F. With such a low temperature differential, overheating is automatically avoided because naphtha in the boundary layer can at worst only approximate the relatively low mercury temperature. The actual rate of heat transfer from condensing mercury attainable through a heat exchange surface is so large that incorporating the required amount of heat exchange surface into a reformer presents no serious problem.

It is a significant advantage of this invention that comparatively small temperature changes in the reformation zone evidencing changes in heat requirements can sharply increase or decrease the heat supplied by the mercury because such small temperature changes correspond to large fractions of the temperature differential between the mercury vapor and the reactants. Thus, a 5° F. change is 10% of a 50° F. temperature differential. Appropriate changes in heat input to the mercury vaporizer easily compensate for shifts in heat requirements of the reformation zone.

Optimum reforming conditions can be readily ascertained by trials with the selected catalyst and the naphtha feed stock. To generalize, reforming temperatures within the contemplation of this invention may range between about 800 and 950° F., preferably between 875 and 950° F. When a temperature is selected as optimum for a particular naphtha and catalyst, the isothermal characteristics of heat exchange against condensing mercury can maintain reformation temperatures within a spread of about 25° F. For instance, at a selected temperature of 920° F., the naphtha undergoing reformation may be held within the temperature limits of 935° F. and 910° F.

Generally speaking, reformation at a pressure in the range of 100 to 500 p. s. i. g. is contemplated for the practice of this invention, preferably 200 to 500 p. s. i. g. Below 100 p. s. i. g., coke formation becomes excessive so as to require too frequent catalyst regeneration. On the other hand, pressures above 500 p. s. i. g. tend to accelerate unduly the hydro-cracking reaction. In the pressure range of 100 to 500 p. s. i. g., these two undesirable reactions are minimized. To avoid these undesirable reactions to a satisfactory extent, the pressure and temperature at which reformation is carried out may be determined by simple trials. The diverse characteristics of the many naphthas which may be reformed according to the process of this invention prevent any clear correlation of reforming pressure and temperature. Catalytically reforming in the preferred ranges of 200 to 500 p. s. i. g. and 875° to 950° F. will give very satisfactory increases in octane number and high gasoline yields for substantially all naphthas.

The complexity of the relationships between pressure, temperature and yield is realized by the art, e. g., the Haensel article on Platforming in the April 1950 issue of Petroleum Processing. However, these are not the only process variables which matter. Catalytic activity and space velocity are also recognized as critical from the standpoint of yield and product quality. To a large extent, the comparative effect of catalyst activity can be balanced off against variations in space velocity whereby the same yield and quality can be obtained regardless of the catalyst. To the extent that improved catalysts can produce results uncompensable by this space velocity factor, a slight temperature increase will substantially equate the product quality. The practice of this invention is not dependent on the activity of the catalyst used, but the reforming temperature may now be set near the upper limit of the reforming temperature range, for example, when less active catalysts are used, without materially increasing the yield loss due to thermal cracking because the overheating incident to adiabatic reforming is avoided.

To explain more particularly the practice of this invention, reference is now made to the accompanying drawing which schematically illustrates, in sectional elevation, a fixed bed reformer in which the invention may be carried out.

A reasonably rich hydrogen stream (60% by volume and higher hydrogen content) from line 10 is mixed with feed naphtha from line 12 and the mixture is preheated in heat exchanger 14 to the range of 800 to 860° F. against the reformer effluent. The total pressure on the feed mixture is in the range of 100 to 500 p. s. i. g. After preheating, the feed mixture passes through line 16 to reactor 18 holding a fixed bed of catalyst 20 supported by a permeable base 22 such as 1-inch ceramic balls. A tubular heat exchanger 24 disposed in reactor 18 is in contact with catalyst bed 20 and acts as a mercury condenser to provide heat for the desired reforming reactions from a substantially isothermal source only 25 to 75° F. above the reformation temperatures. The heat transfer surfaces of exchanger 24 are disposed to provide maximum contact with catalyst bed 20 and minimum obstruction to the flow of the reactants.

By contact with heated catalyst and mercury condenser 24, the feed mixture is rapidly heated to reforming temperatures, and from then on the endothermic heat necessary for aromatization and dehydrocyclization is continuously absorbed from mercury condenser 24 at a rate sufficient to keep the reactants within a 25° F. constancy level during passage through catalyst bed 20. By the time the naphtha enters inert base 22, reformation is completed. The reformed naphtha product still in admixture with hydrogen is removed through outlet line 30, cooled by passage through heat exchanger 14 and sent to a conventional recovery system. Hydrogen recovered from the reformed product is recycled to line 10 for admixture anew with fresh naphtha; the recycle gas obtained after separating the reformed naphtha from the reformer effluent frequently contains more than 75% by volume of hydrogen.

The mercury condensed to impart heat to the reformation is withdrawn from mercury condenser 24 through line 32 and passed into mercury holding vessel 34. Liquid mercury flows from vessel 34 through line 35 to vaporizing coil 38 inside furnace 36. Mercury vapors pass from coil 38 to condenser 24 by way of lines 39 and 40. Operation of the furnace is controlled to maintain the reformation occurring in catalyst bed 20 at the selected temperature level. A thermocouple 42 embedded in catalyst bed 20 is connected to a temperature controller 44 which in turn adjusts control valve 46 on the furnace fuel line 48. When the temperature in catalyst bed 20 drops, controller 44 acts to open valve 46 and allow more fuel into furnace 36. The effect of increasing furnace heat is to increase the mercury vaporization rate and ordinarily the pressure and temperature of the mercury vapors inside condenser 24. In turn, the resultant increase in mercury pressure and temperature raises the temperature differential across the walls of condenser 24, forcing more heat into catalyst bed 20 and thereby overcoming the indicated deficiency. If the temperature in catalyst bed 20 rises, controller 44 acting in the reverse direction rapidly decreases the heat available to the reformation. This control on the closed mercury system is sufficiently precise to maintain the reformation temperature at any point in the reaction mass within ±5° F. of the desired temperature for that point. As already stated, the temperature assumed by the naphtha undergoing reformation (not including the temperature rise necessary to bring the preheated naphtha to reforming temperatures) does not vary more than about 25° F. from start to finish of the reforming reaction.

For a further understanding of this invention, the following specific examples are set forth.

*Example 1.*—A West Texas-Venezuela blend having the characteristics shown in column A of Table II is preheated to the reforming temperature and then reformed substantially isothermally under the conditions listed in Table I for Example 1 to produce the yields and product characteristics tabulated in that column.

*Example 2.*—Using the same feed stock as in Example 1, an adiabatic run is made under the conditions shown in Table I for Example 2 to secure substantially the same yield of Example 1. The octane number of the resulting product is lower than that achieved in Example 1.

*Example 3.*—Using the same feed stock, an adiabatic run is made at lowered space velocity under the conditions shown in Table I for Example 3 to secure the octane number achieved in Example 1. The yield suffers thereby.

*Example 4.*—For the purpose of contrasting the improvement in yields, an isothermal run is made at increased space velocity under the conditions shown in Table I for this example to achieve the octane number of Example 2.

*Example 5.*—An additional isothermal run is made at lowered temperature to attain the octane number of Example 2. Comparison of the conditions and results given in Table I for Examples 4 and 5 shows to what extent alternative changes in temperature and space velocity can secure substantially identical results in an isothermally operated reformer.

*Example 6.*—For comparative purposes an isothermal run is made under the conditions shown in Table I using a higher boiling point mid-continent naphtha of the characteristics set forth in column B of Table II.

ing apply equally well to moving bed and fluidized bed operations and such operations are contemplated for this invention. In fact, reformation in a fluidized catalyst bed is highly desirable because the reformation temperature can be maintained within an even narrower range of constancy, e. g., less than a 10° F. temperature swing for the entire reformation. Also, fluidization minimizes the boundary layer of naphtha along the heat transfer surfaces in the reformer, thereby further ensuring uniformity of reaction conditions. Molybdenum-type reforming catalysts are favored for fluidized operation while platinum-type reforming catalysts are often preferred for fixed bed operation.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A process for reforming a hydrocarbon stock which comprises introducing into a reformation zone a mixture

Table I

| Example | 1 | 2 | 3 | 4 | 5 | 6 |
|---|---|---|---|---|---|---|
| Type of Operation | Iso. | Adi. | Adi. | Iso. | Iso. | Iso. |
| Charge Stock | A | A | A | A | A | B |
| Feed Temperature, °F | 900 | 975 | 975 | 900 | 885 | 890 |
| Pressure, p. s. i. g | 300 | 300 | 300 | 300 | 300 | 475 |
| Space Velocity, V./hr./V | 3.0 | 3.0 | 2.6 | 4.0 | 3.0 | 3.0 |
| Gasoline Yield, C$_4$+, V. percent of Charge Stock | 89.1 | 88.9 | 87.8 | 90.3 | 90.0 | 91.1 |
| Butanes Required, V. percent of Charge Stock | 7.6 | 7.0 | 6.4 | 8.1 | 8.3 | 9.1 |
| Gasoline Yield, 10# RVP, V. percent of Charge Stock | 96.7 | 95.9 | 94.2 | 98.4 | 98.3 | 100.2 |
| Octane Number, CFRR Clear, 10# RVP Gasoline | 93.6 | 92.2 | 93.6 | 92.1 | 92.2 | 87.6 |
| Hydrogen Purity, V. percent of Recycle Gas | 91.4 | 88.8 | 87.0 | 92.0 | 93.0 | 92.7 |
| Coke Yield, W. percent of Charge Stock | <0.001 | >0.01 | 0.02 | <0.001 | <0.001 | <0.001 |

A platinum catalyst was used in each of the examples.

Notes:
Iso.—isothermal.
Adi.—adiabatic.
V./hr./V.—liquid volumes of charge stock per hour per volume of reformation zone.
C$_4$+—hydrocarbons of 4 and more carbon atoms.
Butanes Required—butanes from another source required to be added to the reformed gasoline to attain 10# RVP.
10# RVP—10 pound Reid vapor pressure.
V. percent—volume percent.
W. percent—weight percent.

Table II
CHARGE STOCKS

| | A | B |
|---|---|---|
| Source | West Texas-Venezuela Blend. | Mid-Continent. |
| Gravity, °API | 53 | 52.7. |
| ASTM Distillation, °F.: | | |
| Initial Boiling Point | 226 | 218. |
| 10% | 243 | 257. |
| 50% | 271 | 310. |
| 90% | 322 | 381. |
| End Point | 362 | 409. |
| Surfur, W. Percent | 0.07 | 0.04. |
| Octane Number, CFRM | 45 | 34. |
| Paraffins, V. Percent | 45 | 48. |
| Olefins, V. Percent | 1 | 0. |
| Naphthenes, V. Percent | 42 | 36. |
| Aromatics, V. Percent | 12 | 16. |

In most instances where mercury vapors are employed as the isothermal source of heat for the reformation zone, the reformer is designed with heat transfer surfaces to provide a temperature differential of the order of 50° F. between the mercury vapors and the reactant mixture.

Although the invention has been described in terms of fixed bed operation, it is obvious that the invention is not so limited. The same process criteria for good reformof said stock and hydrogen at a temperature of at least about 50° F. below the temperature of the products of reformation leaving said reformation zone, said reformation zone containing a reforming catalyst and being maintained at a pressure in the range of about 100 to 500 p. s. i. ga., heating said mixture during passage through said reformation zone by indirect heat exchange under isothermal conditions with condensing mercury vapors, the temperature differential between the condensing mercury vapors and the mixture passing through the reformation zone being not more than about 75° F., and thereby maintaining reformation temperatures of the mixture undergoing reforming within a spread of not more than about 25° F., and removing said products of reformation in admixture with hydrogen from said reformation zone.

2. A single stage process for reforming naphtha which comprises preheating a pressurized mixture of said naphtha and hydrogen to a temperature of at least about 50° F. below the temperature of the products of reformation leaving said reformation zone by indirect heat exchange with the products of reformation, passing the thus preheated mixture through a reformation zone containing a reforming catalyst and maintained at a pressure in the range of about 100 to 500 p. s. i. ga., heating said mixture during passage through said reformation zone by indirect heat exchange under isothermal conditions with condensing mercury vapors, the temperature differential between the condensing mercury vapors and the mixture passing through the reformation zone being not more than about 75° F., and thereby maintaining reformation temperatures of the mixture undergoing reforming within a spread of not more than about 25° F., and removing said products of reformation in admixture with hydrogen from said reformation zone.

3. The process of claim 1 wherein the hydrocarbon stock is preheated by indirect heat exchange with the product mixture removed from said reformation zone and then is passed directly to said reformation zone.

4. The process of claim 2 wherein the temperature differential between the condensing mercury vapors and the mixture passing through the reformation zone is of the order of 50° F.

References Cited in the file of this patent

UNITED STATES PATENTS

| | | |
|---|---|---|
| 2,423,833 | Hirsch | July 15, 1947 |
| 2,642,381 | Dickinson | June 16, 1953 |